July 1, 1958
A. W. STASTNY
2,841,039
TAPER CUTTING DEVICE
Filed May 18, 1955
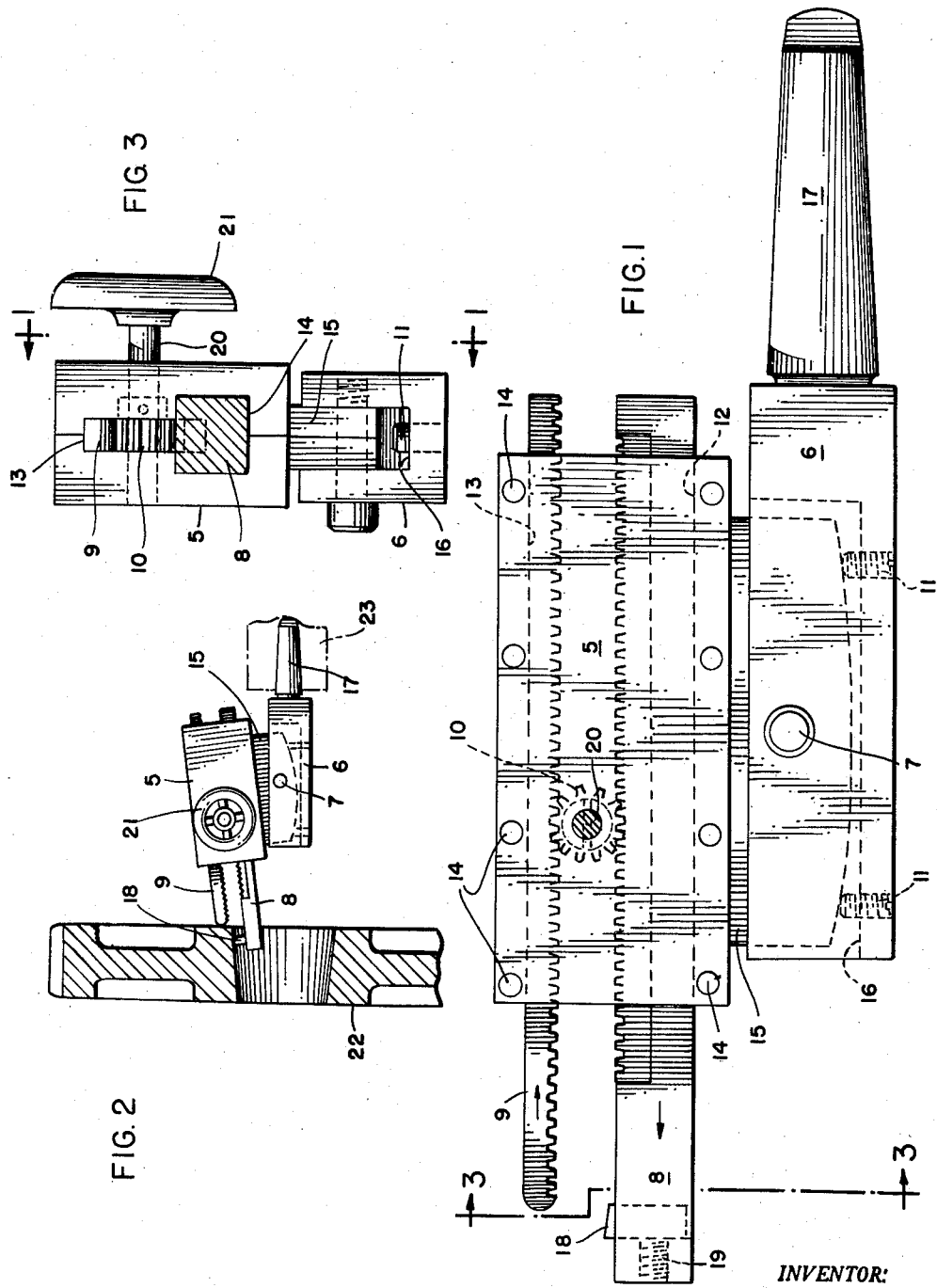
INVENTOR:
ADAM W. STASTNY
BY
ATT'YS

2,841,039

TAPER CUTTING DEVICE

Adam W. Stastny, Oak Park, Ill.

Application May 18, 1955, Serial No. 509,272

4 Claims. (Cl. 77—58)

This invention relates to machine-lathe cutting tools for forming taper cuts.

The main objects of this invention are to provide an improved form of tool-holding and advancing device for use on machine lathes for cutting taper cuts; to provide an improved device of this kind wherein the advance of the cutting tool relative to the work, or vice versa, automatically alters the radial and axial disposition of the cutting tool to the cut being made; to provide a tool-advancing holder of this kind having improved means for varying the angular disposition of the tool to the axis of the taper; and to provide an improved device of this kind which is simple in construction, hence economical to manufacture, and which is conveniently attachable to the saddle turret, tool-post or spindle of a lathe and is highly efficient in its functioning.

In the accompanying drawings:

Figure 1 is a side elevation of the improved tool-holding and advancing device constructed in accordance with this invention.

Fig. 2 is a reduced scale side elevation of the improved tool-holding and advancing device in operative relationship to a piece of work wherein a tapered bore is to be cut; and Fig. 3 is an end elevation, partly sectional, of this improved tool-holding and advancing device, as viewed from the plane of the line 3—3 of Fig. 1; and line 2—2 indicating the plane wherefrom the side elevational view of Fig. 1 is taken.

The essential concept of this invention involves a pair of hingedly connected members one of which slidably supports oppositely-shiftable gear-rack elements meshing with an intermediate pinion and the other member is supportable in a machine lathe saddle turret, tool-post or spindle, the two members being angularly adjustable relative to each other to determine the degree of taper to be cut on a piece of work.

A taper-cutting tool-holding and advancing device embodying this concept comprises a pair of members 5 and 6 hingedly connected together by a pin 7, the former of which supports a pair of oppositely-shiftable elements, in the form of gear racks 8 and 9 meshing with a pinion 10, and the latter of which members is adapted for positioning on a machine lathe saddle turret, tool-post or spindle and is provided with adjusting screws 11 for altering the relative angular disposition of the two members.

The member 5 is here shown as a two-piece structure machined to form an end-to-end slot for the reception of the rack elements 8 and 9, sliding on the respectively opposed surfaces 12 and 13. The two pieces are secured in their assembled relationship by suitable rivets or screws 14.

On its underside, the member 5 is formed with a tongue 15 which fits in a recess 16 in the member 6 and is hingedly secured to the member 6 by the pin 7.

The member 6 has a tapered extension 17 which fits in the socket of a machine lathe saddle turret, tool-post, or spindle.

The rack elements 8 and 9 are of a length to extend outwardly of the member 5 and forwardly of the member 6, with the end of the element 8 normally in advance of the end of the element 9.

The element 8, adjacent its forward end, is recessed to receive a cutting tool 18, held in place by a set screw 19.

The pinion 10 is here shown journaled forwardly of the transverse median of the member 5. The pinion is keyed to a shaft 20, extending to the exterior of the member 5 whereon is fixed a hand wheel 21.

The screws 11 are located in the base of the member 6 at opposite sides of the hinge pin 7. These screws 11 bear against the under arcuate face 16 of the tongue 15 of the member 5. The complimentary adjustment of these screws 11 determines the relative angularity of the two members 5 and 6 and consequently the degree of taper which is to be cut by the cutting tool 18.

This improved tool-holding and advancing device may be used in the following manner:

The work 22, indicated in Fig. 2 as a gear wheel, is mounted on the head stock (not here shown) of a conventional machine lathe, whereby the work is rotated in the usual manner.

This tool-holding and advancing device has the extension 17 on the member 6 inserted in the socket of the conventional saddle turret, tool-post or spindle, indicated at 23 in Fig. 2. The tool is manually shifted toward the head stock to bring the forward ends of the rack elements 8 and 9 contiguous to the work 22 substantially as shown in Fig. 2.

By turning the hand wheel 21, the end of the rack element 9 is caused to abut the face of the hub of the work 22, with the point of the cutting tool 18 positioned to initiate the cutting operation on the work 22.

Once such positioning of the rack elements 8 and 9 is effected, the lathe is put into operation.

As will be quite apparent from Fig. 2, as the saddle turret, tool-holder or spindle advances (by the feeding device of the lathe) the pressure on the end of the rack element 9 shifts it rearwardly and causes the pinion 10 to shift the rack element 8 forwardly, thus advancing the cutting tool 18 radially and axially inwardly along the previously but roughly formed bore of the work 22.

Although but one specific embodiment of this invention is herein shown and described, it will be understood that numerous details of the structure shown may be altered or omitted without departing from the spirit of the invention as defined by the following claims.

I claim:

1. A taper-cutting device comprising, a pair of hinged members movable toward a piece of work whereon a taper is to be cut, a pair of rack elements slidably mounted on one member on opposite sides of a meshing pinion journaled on the member to effect the opposite parallel shifting of the elements, the adjacent ends of the elements extending beyond the member mounting the elements, a cutting-tool supported on one end of one of the rack elements, means for altering the relative angularity of the two members for predetermining the angularity of the elements to the axis of the work and consequently the pitch of the taper to be cut on the work, and other means for manually actuating the pinion to initially adjust the adjacent advance ends of the elements to abut the end of the other element against the face of the work with the tool disposed to initiate the taper-cutting operation, whereby the subsequent forward movement of the members effects a constant and uniform advance of the tool-supporting element in the plane in which it was initially angulated to the axis of the work.

2. A taper-cutting device comprising, a pair of hinged members movable toward a piece of work whereon a taper is to be cut, a pair of rack elements slidably mounted on one member on opposite sides of a meshing pinion journaled on the member to effect the opposite parallel shifting of the elements, the adjacent ends of the element extending beyond the member mounting the elements, a cutting-tool supported on one end of one of the rack elements, adjusting screws on one of the members located on opposite sides of the hinge for fixedly altering the relative angularly of the two members for predetermining the angularity of the elements to the axis of the work and consequently the pitch of the taper to be cut on the work, and means for manually actuating the pinion to initially adjust the adjacent advance ends of the elements to abut the end of the other element against the face of the work with the tool disposed to initiate the taper-cutting operation, whereby the subsequent forward movement of the members effects a constant and uniform advance of the tool-supporting element in the plane in which it was initially angulated to the axis of the work.

3. A lathe taper-cutting tool comprising, a slotted member having an extension for detachable mounting on a lathe tool-slide, a second member having a tongue seated in the mounting member slot and hinged to the mounting member for altering the longitudinal angularity of the two members, the members being movable toward a piece of work whereon the taper is to be cut, a pair of parallel elements slidably mounted on the second member, a rotating means operatively interposed between the elements to effect their opposite shifting, a cutting tool supported on one end of one of the elements, and an additional means for manually adjusting the elements relative to each other to selectively alter the longitudinal disposition of the adjacent ends of the two elements and dispose the other element in contact with the opposed face of the work and set the cutting-tool in position to initiate the cutting operation, whereby the subsequent forward movement of the members effects a constant and uniform advance of the tool-supporting element in the plane in which it was initially angulated to the axis of the work.

4. A lathe taper-cutting tool comprising, a slotted member having an extension for detachable mounting on a lathe tool-slide, a second member having a tongue seated in the mounting member slot and hinged to the mounting member for altering the longitudinal angularity of the two members, the members being movable toward a piece of work whereon the taper is to be cut, a pair of parallel elements slidably mounted on the second member, a rotating means operatively interposed between the elements to effect their opposite shifting, a cutting tool supported on one end of one of the elements, means for fixedly altering the longitudinal angularity of the two members so as to determine the pitch of the cutting tool relative to the axis of the work, and an additional means for manually adjusting the elements relative to each other to selectively alter the longitudinal disposition of the adjacent ends of the two elements and dispose the other element in contact with the opposed face of the work and set the cutting tool in position to initiate the cutting operation, whereby the subsequent forward movement of the members effects a constant and uniform advance of the tool-supporting element in the plane in which it was initially angulated to the axis of the work.

References Cited in the file of this patent

UNITED STATES PATENTS

| | | |
|---|---|---|
| 472,546 | McNaull | Apr. 12, 1892 |
| 1,096,152 | Chapman | May 12, 1914 |
| 1,522,124 | Hoisington | Jan. 6, 1925 |
| 2,089,078 | Tyson | Aug. 3, 1937 |